United States Patent [19]
Houseman et al.

[11] 3,823,616
[45] July 16, 1974

[54] HAND GRIP CONTROL ASSEMBLY

[75] Inventors: Henry J. Houseman, Fairless Hills; Louis C. Roll, Philadelphia, both of Pa.

[73] Assignee: Eaton Corporation, Cleveland, Ohio

[22] Filed: June 4, 1973

[21] Appl. No.: 366,960

[52] U.S. Cl................ 74/471, 74/551.9, 180/65 R, 200/157, 200/172 A
[51] Int. Cl............................................. G05g 5/00
[58] Field of Search.................. 74/469, 471, 551.9; 180/65 R; 200/157, 172 A, 6 B

[56] References Cited
UNITED STATES PATENTS

| | | | |
|---|---|---|---|
| 2,954,707 | 10/1960 | Kalous................................. | 74/504 |
| 3,073,328 | 1/1963 | Chillson et al..................... | 123/97 R |
| 3,183,989 | 5/1965 | Trusook et al..................... | 180/65 R |
| 3,190,994 | 6/1965 | Becker et al........................ | 200/157 |
| 3,198,922 | 8/1965 | Rohase ............................... | 74/471 |
| 3,207,860 | 9/1965 | Korsgren, Jr. et al. ............ | 200/17 R |
| 3,573,412 | 4/1971 | Uhrich................................. | 200/157 |

*Primary Examiner*—Samuel Scott
*Assistant Examiner*—Wesley S. Ratliff, Jr.
*Attorney, Agent, or Firm*—Teagno & Toddy

[57] ABSTRACT

A hand grip control assembly is constructed to provide at least three independent control signals in response to predetermined manipulations of a single hand when supported by the control assembly. The control assembly has a base to which a spaced pair of support members are rigidly affixed. Between these support members a first and a second rotating member is mounted. The first member provides a main hand support which the hand may grasp and rotate to actuate a first control signal. The second member is mounted proximately to and in line with the first member to allow the thumb of the hand grasping the first member to also rotate the second member and actuate a second control signal. The third member is movably mounted to the base to allow the fingers of the hand grasping the first member to also depress the third member and actuate a third control signal. The control assembly is mountable on a control panel of an industrial truck to allow the truck operator to actuate at least three truck functions while simultaneously supporting himself by grasping the control assembly with his hand.

15 Claims, 4 Drawing Figures

HAND GRIP CONTROL ASSEMBLY

BACKGROUND OF THE INVENTION

1. Field of the Invention

This invention relates to manual control assemblies generally, and more particularly to a control assembly for an industrial truck by which a truck operator may support himself by grasping the assembly with one hand and simultaneously being able to actuate at least three control functions by predetermined manipulation of the hand grasping the assembly.

2. Description of the Prior Art

Heretofore, manual control assemblies on vehicles included control handles which would produce a control signal dependent upon either rotation, linear deflection, or pivoting of the control handle. As such the control handle offered no support and the vehicle operator had to depend upon another separate structure to support himself while operating the control handle. Obviously the placement of any support force on the control handle would possibly deflect it and unintentionally produce an undesired control signal. Separate support structures such as hand grips and rails are found on controlled vehicles, such as industrial trucks, just for such support purposes.

Control handles allowing the vehicle operator to actuate more than one control function are also known. An example of such a control handle is found in U.S. Pat. No. 3,235,035, issued to G. H. Weaver, Jr. This control handle has a knob which is rotated to provide one control function and a pushbutton, centrally located within the knob, which is depressed to provide a second control function. The knob and pushbutton are both mounted next to a hand grip which acts through a lever arm to provide a third control function. Although this control handle provides a number of control functions it is incapable of also providing a support structure which would allow the operator to support himself while he simultaneously actuates the various control functions. Furthermore, the various control functions of the Weaver, Jr. reference can not be simultaneously actuated by the operation of a single hand of the operator. If the operator maintains his hand on the hand grip, he can at the same time only actuate the knob with his thumb. To actuate the push-button mounted in the knob, he must either remove his thumb from the knob and depress the pushbutton or depress the pushbutton with his other hand.

The present invention, however, discloses a new and improved control assembly which solves the above-mentioned problems and others of the known prior art devices and provides a control assembly which acts as a support means for the operator while allowing him to simultaneously actuate at least three control functions with predetermined manipulations of the single hand grasping the control assembly.

SUMMARY OF THE INVENTION

In accordance with the present invention, therefore, a control assembly is provided for an industrial truck comprising a first and second rotational means and a linearly movable means all of which are mounted to a mounting means which operatively connects the first and second rotational means and the linearly movable means into a unitary assembly. This single assembly is mounted to a control panel of an industrial truck. Thusly mounted, the assembly provides a support means for the truck operator whereby he may grasp the control assembly with one hand and simultaneously actuate up to three control signals with the same hand grasping the control assembly.

The first rotational means of this assembly includes a tubular hand grip supportably mounted to the mounting means of the assembly. The hand grip is grasped with the hand of the industrial truck operator and rotated by the wrist action of the hand grasping the hand grip to actuate a first control function.

The second rotational means of this assembly includes a thumb knob which is also supported by the mounting means of the assembly and mounted in line and next to the hand grip so as to be simultaneously rotatable by the thumb of the hand grasping and operating the hand grip. Thus a second control function may be actuated simultaneously with the first.

The linearly actuated means of this assembly includes a depression plate also mounted to the mounting means of the assembly but a small space away from the hand grip to allow the fingers of the hand grasping the hand grip to actuate the depression plate and thereby actuate a third control function while the hand and thumb are simultaneously actuating separate first and second control functions.

Further in accordance with the invention, the hand grip, the thumb knob and the depression plate may actuate various different types of controls to provide different control functions. These control functions may be all proportional, all digital, or may involve a combination of proportional and digital control functions as may be required by the particular application.

For a combination of proportional and digital control functions, the hand grip is directly connected to a control signal means which provides a proportional output signal in direct response to any rotation of the hand grip. Thus the hand grip provides an easily controlled proportional control output signal from the control signal means. The thumb knob is directly connected to a cam having at least three detents. At least three switches are positioned around the cam so as to be actuated at predetermined angles of cam rotation. Thus predetermined rotations of the thumb knob change the cam angle and provide up to three digital output signals. These three digital output signals are simultaneously actuatable along with the actuation of the proportional output signals provided by the rotation of the hand grip. The depression plate is connected to a rocker arm which actuates a fourth switch allowing a fourth digital control signal to be actuated by the depression plate simultaneously with the actuation of the proportional control signal and the first three digital control signals.

From the foregoing it is seen that the control assembly of the present invention provides three independent controls all mounted to a mounting means which supports the controls. The control assembly is mounted to the control panel of an industrial truck and also acts as a support handle for an operator of the truck grasping the control assembly. Because of the unique placement of the individual controls within the control assembly, the truck operator is able to simultaneously actuate at least three separate control functions without removing or moving the supporting grip of his hand from the control assembly.

It will thus be seen that by allowing the truck operator to support himself with the same hand actuating truck control functions, his other hand is free to perform further control functions. This gives the truck operator more freedom of action allowing him to perform his duties more efficiently.

An object of the present invention, therefore, is to provide a control assembly which will supportably mount three separate controls and will also act as a support handle for the operator of the control assembly.

Another object of the present invention is to provide a control assembly having at least three separate controls simultaneously actuable by predetermined manipulations of a single hand grasping the control assembly.

Yet another object of the present invention is to provide a control assembly having a proportional control switch and digital control switches actuated by separate controls of the control assembly.

These and other objects of the present invention will become clearer from a reading of the following description of the preferred embodiment in conjunction with the drawings.

DESCRIPTION OF THE PREFERRED EMBODIMENT

Figure 1:
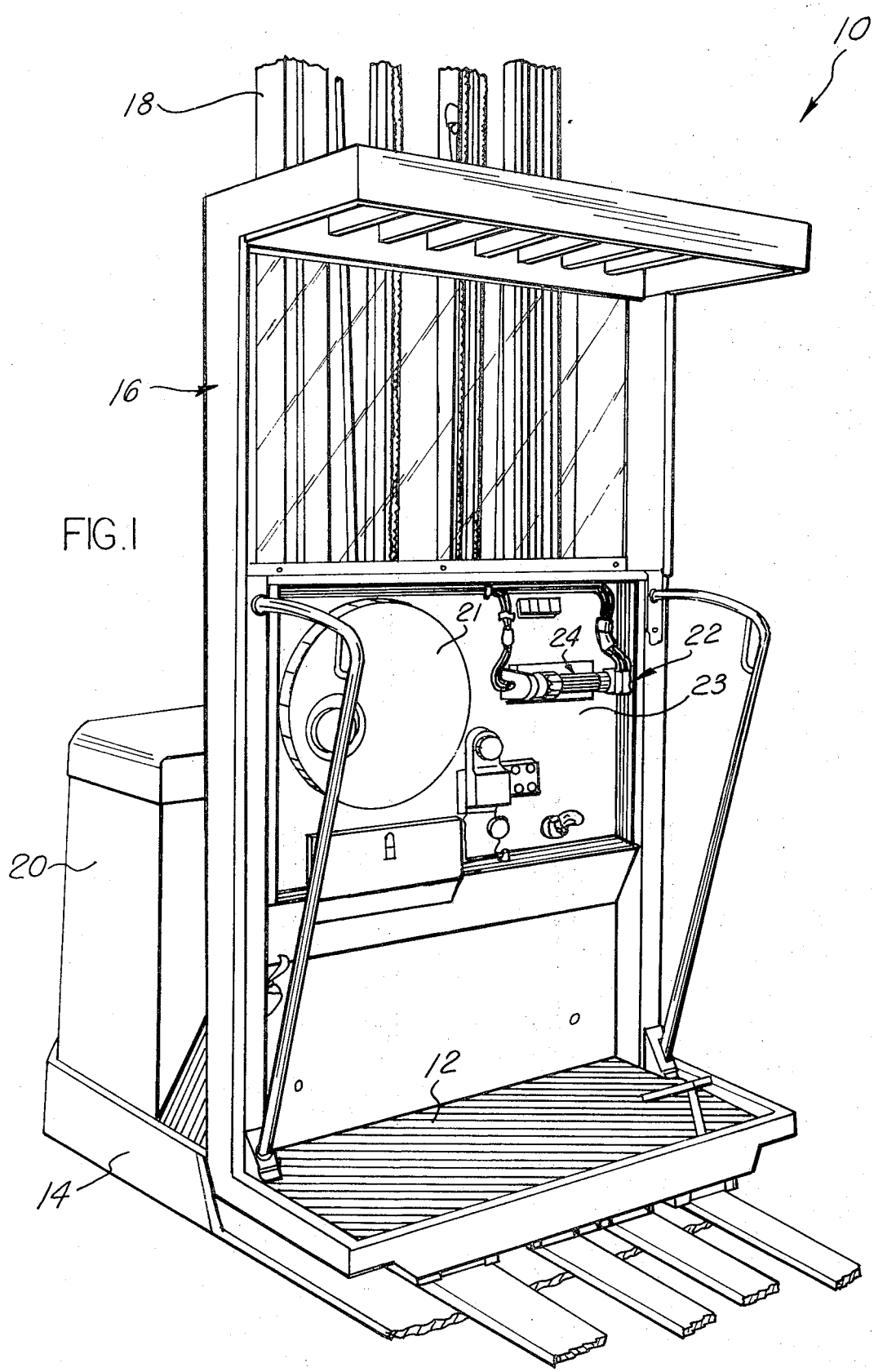
FIG. 1 is a perspective drawing of an industrial truck controlled by the novel control assembly with parts removed for clarity.

Referring now to the drawings, the showings therein are presented for purposes of describing a preferred embodiment of the invention and are not presented for purposes of limiting the invention thereto.

Referring specifically to FIG. 1, an industrial truck 10 of a specific type known as an order picker is shown to have a control handle assembly 22 for actuating predetermined control functions of the industrial truck 10. The industrial truck 10 has a main frame 14 to which uprights 18 are mounted and a load carriage 16 including an operator's platform 12 mounted for travel along the uprights 18. A battery compartment 20 is located at one end of the truck 10 to provide the electrical power necessary to drive the truck as well as to actuate the various controls required.

The industrial truck 10 is controlled by an operator standing on the operator's platform 12 who controls the various controls located on the control panel 23 of the truck 10. The truck 10 is steered by the operator maintaining one hand on the steering wheel 21 and turning it appropriately to negotiate various turns that may be required. With his other hand, the operator grasps the control handle assembly 22 to both support himself as well as to actuate various control functions of the truck, including acceleration, lift direction and speed, and the sounding of a warning horn. As will be described in more detail later, the control handle assembly 22 has separate controls for actuating the acceleration of the truck 10, for controlling the speed and direction of travel of the operator's platform 12 and load carriage 16, as well as the sounding of a warning horn. All of these control functions are actuated without the operator having to lose his support obtained from grasping the control handle assembly 22. Predetermined manipulations of the wrist, the thumb and the fingers of the hand grasping the control handle assembly 22 may individually or simultaneously actuate one or more of the previously mentioned control functions.

Figure 2:
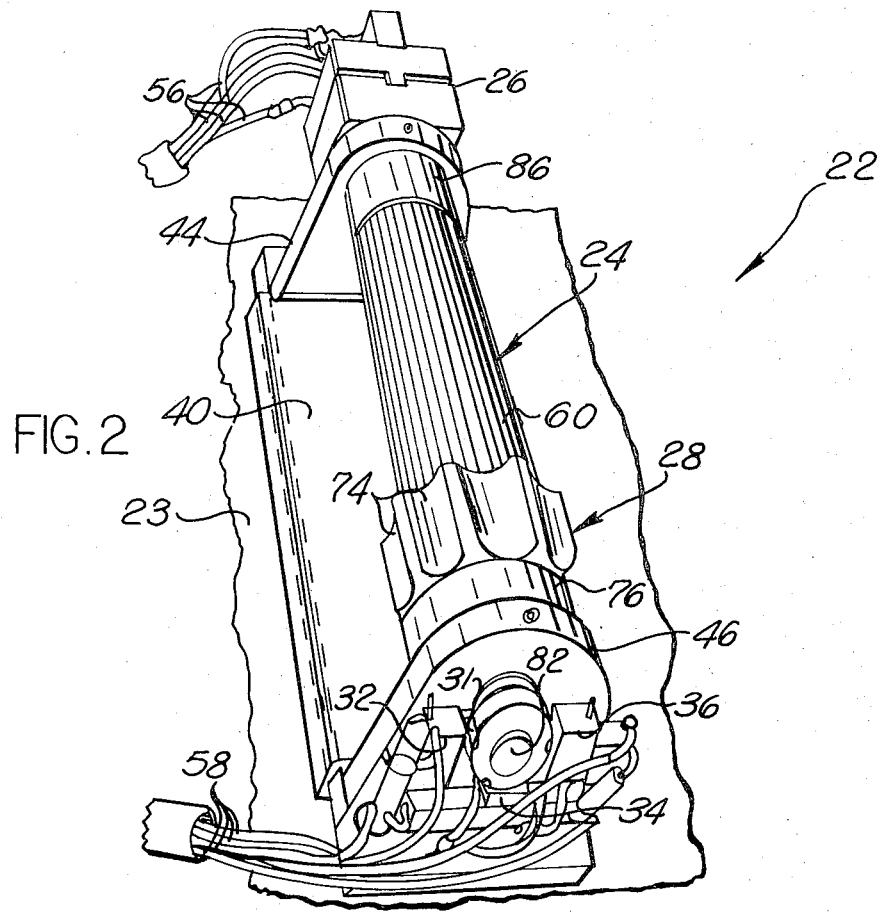
FIG. 2 is a perspective drawing of the novel control assembly.
Figure 3:
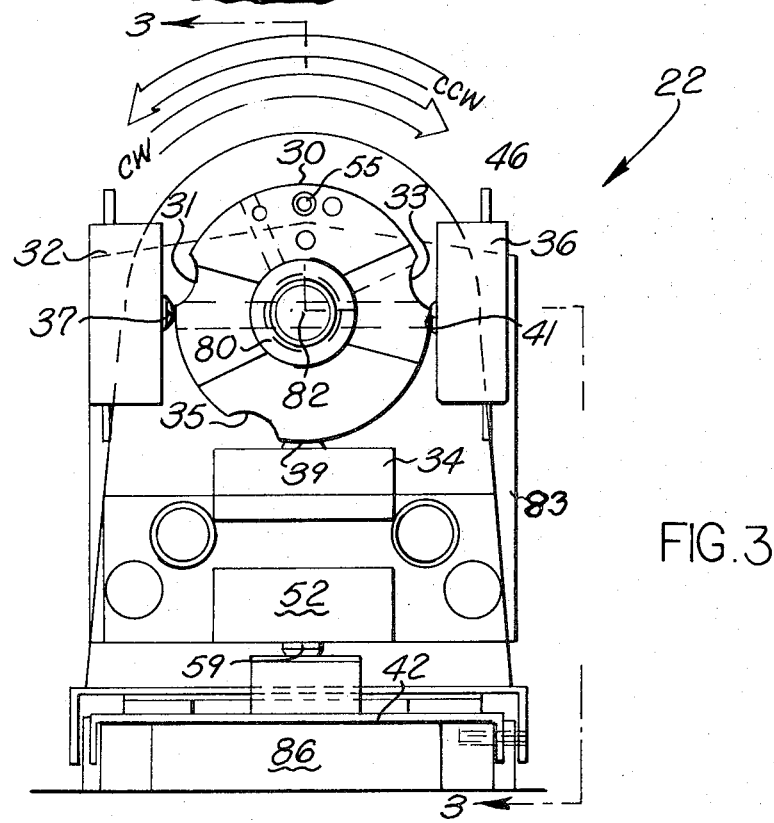
FIG. 3 is an end-view of the control assembly of FIG. 2.
Figure 4:
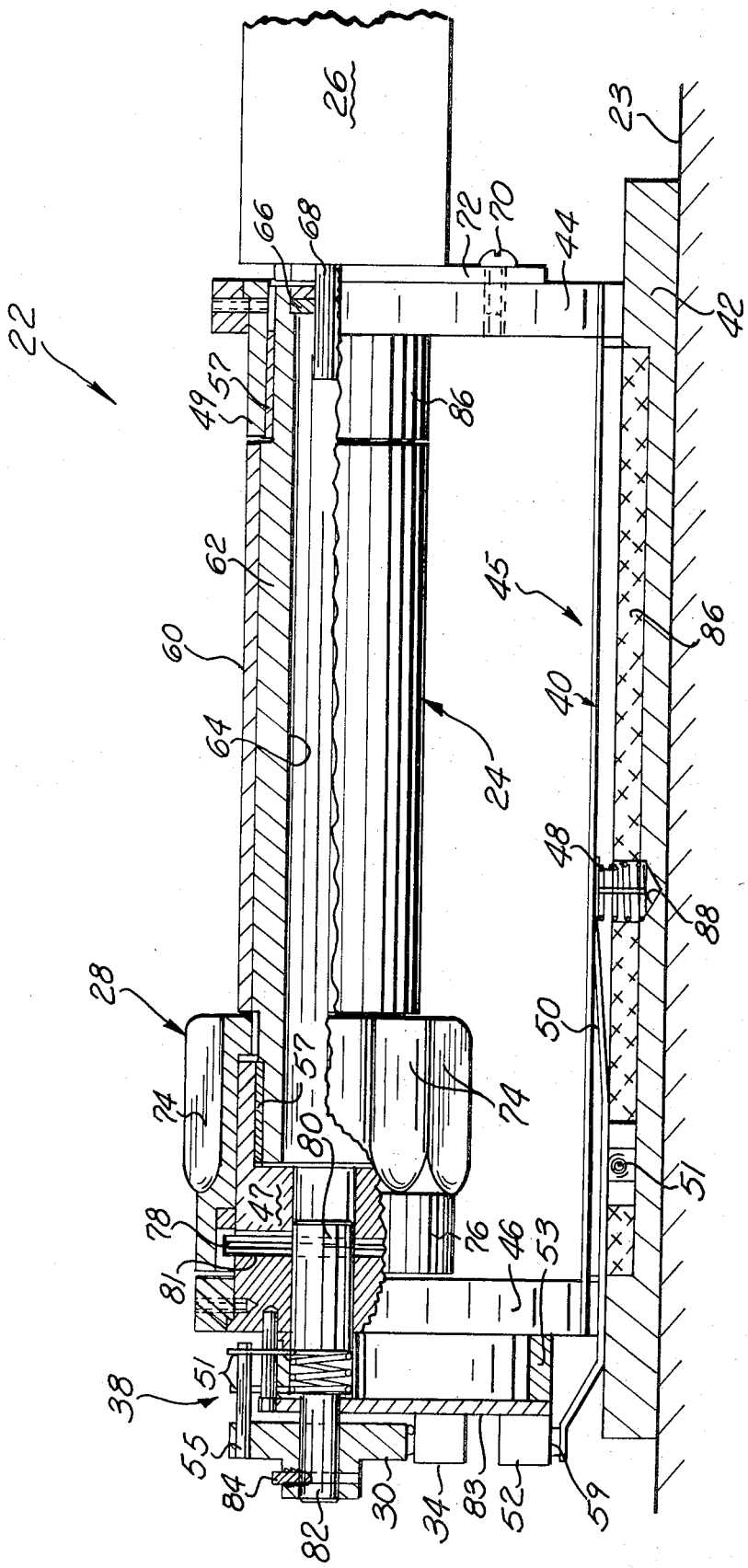
FIG. 4 is a partially cut away top view of the control assembly of FIG. 2.

Referring now to FIGS. 2 through 4, the control handle assembly 22 is shown to include a hand grip assembly 24 which is supportably mounted between support members 44 and 46 securely affixed to base plate 42. It will be understood that the base plate 42 is mounted to the control panel 23 of truck 10 by well known means such as screws. Mounted between the supports 44 and 46 and proximately to the hand grip assembly 24 is a thumb knob assembly 28. Spaced away from both the hand grip assembly 24 and the thumb knob assembly 28 is a trip plate 40 extending across the face of the base plate 42 between the supports 44 and 46. The proximity of the hand grip assembly 24 to the thumb knob assembly 28 and the trip plate assembly 40 allows the operator of the vehicle 10 to grasp with a single hand the hand grip assembly 24 and at the same time place the thumb of the same hand on the thumb assembly 28 and some of the fingers of the same hand on the trip plate assembly 40. Since the hand grip assembly 24 as well as the thumb knob assembly 28 are supported between the supports 44 and 46, the operator may easily support himself by grasping the hand grip 24 with the palm and some fingers of the hand since the horizontal force of the operator's weight is applied to the support members 44 and 46 and does not result in the actuation of any undesired control signal.

The hand grip assembly 24 has a tubular handle 62 having a hollow core 64 and a roughened outer hand grip 60. The roughened outer grip 60 provides a firm grasping surface to the hand of the operator even when his hands are slippery to facilitate the positive rotation of the hand grip assembly 24 by a movement of the wrist of the hand while the palm and some fingers of the hand are grasping the roughened outer grip 60. The hand grip assembly 24 is supported at each end by bearings 57 mounted in end caps 47 and 49. The bearings 57 provide relatively frictionless rotation of the hand grip assembly 24.

The hand grip assembly 24 is directly coupled to an accelerator switch 26 by way of a pin 66 connecting an input shaft 68 of the accelerator switch 26 to the tubular handle of the hand grip assembly. The accelerator switch 26 is of a well known construction available from the Square D Corporation and includes a standard potentiometer assembly (not shown) whose resistance varies in direct proportion to the rotation of the input shaft 68 and directly, therefore, upon the degree of rotation that the directly coupled hand grip assembly 24 is subjected to. The accelerator switch 26 is mounted to the support 44 by way of screws 70 extending through a mounting plate 72 of the accelerator switch 26 into the support 44. The accelerator switch 26 includes biasing means (not shown) which bias the input shaft 68 towards a neutral position of zero resistance and cause the return of the potentiometer of the accelerator switch 26 to such neutral position whenever the input shaft is relieved of any torque which may have rotated it in either direction. As will be appreciated by those skilled in the art, the magnitude as well as the polarity of the signal provided by the accelerator switch 26 may be changed by a rotation of the input shaft 68 in opposite directions from the neutral position. As such the proportional output signal is easily varied both as to magnitude and polarity and, therefore, provides an ideal acceleration and direction control signal to vary the speed and direction of the industrial truck 10.

The thumb knob assembly 28 has a series of thumb fitting depressions 74 located around the circumference of the thumb knob assembly 28. Each thumb fitting depression provides a thumb contoured recess allowing for comfortable placement of the thumb therein and easy rotation of the thumb knob 28 thereby. It will be appreciated that the proximate location of the thumb knob assembly 28 to the hand grip assembly 24 allows the operator to easily and separately manipulate the thumb knob assembly 28 while simultaneously gripping and separately manipulating the hand grip assembly 24. The thumb knob assembly 28 is rotatably mounted around the end cap 47 and is connected to a shaft 80 by way of a pin 78 extending through a neck portion 76 of the thumb knob assembly 28 into the shaft 80. The end cap 47 is formed with a groove 81 which allows unhindered rotation of the pin 78 through a limited angle of rotation of the thumb assembly 28. This limited rotation is more than sufficient to actuate the control functions peculiar to the thumb knob assembly 28, as will be later described.

The shaft 80 is rotatably mounted in the end cap 47 and has a smaller diameter shaft section 82 which extends through a mounting plate 83 to have a cam 30 mounted thereto by way of a set screw 84. It will thus be understood that any rotation of the thumb assembly 28 will result in a similar direct rotation of the cam 30. The rotation of the cam 30 actuates a series of switches by way of detents on the cam 30 with each switch actuation being dependent upon the direction as well as degree of cam rotation. A number of truck control functions may be actuated by these switches around the cam 30.

As best seen with reference to FIG. 3, the cam 30 has a detent 31 which is associated with a switch 32 mounted at an end of plate 83 and proximately to the cam 30. Similarly, a switch 34 is mounted at a side of the cam 30 and proximately to a detent 35. A switch 36 is mounted opposite the switch 32 and proximate to the cam 30 near a detent 33 in the cam 30.

The construction and placement of these switches 32, 34 and 36 around the cam 30 lends itself very readily to certain truck controls. The switch 32 is connected by way of electrical leads 58 to the control system (not shown) of the industrial truck 10 to control the lifting of the carriage 16 along the uprights 18 at a first "low" speed. Similarly the switch 34 is connected to the control system of the truck 10 by way of electrical leads 58 to control the lifting of the carriage 16 at a second "high" speed. The carriage 16 is lowered at a constant single speed under the control of the switch 36. The cam 30 is shown in FIG. 3 to be in a neutral position in which all of the switches 32, 34, and 36 are unactuated and perform no control function.

When the thumb knob assembly 28 is rotated counterclockwise the detent 31 becomes aligned with a runner 37 of the switch 32 which allows the runner 37 to move into the detent 31 and actuate the switch 32 and start the carriage 16 of the vehicle 10 to be lifted at a "low" speed. A further counterclockwise rotation of the cam 30 will simultaneously disengage the runner 37 from the detent 31 while engaging a runner 39 of the switch 34 with the detent 35 on the cam 30. This will change the lift speed of the carriage 16 from a "low" to a "high" speed.

When the thumb knob assembly 28 is rotated clockwise from the shown neutral position, the detent 33 on the cam 30 is aligned with a runner 41 of the switch 36. When the runner 41 moves into the detent 33, the switch 36 actuates the lowering of the carriage 16 at a constant single speed. It will be noted that the detents 31, 33, and 35 are oriented on the cam 30 to insure that only one of the switches 32, 34, and 36 is actuated within the predetermined rotation of the cam 30.

The thumb knob assembly 28 is fail-safe in operation since the cam 30 will return to the neutral position, in which no control functions are actuated, whenever the torque rotating the thumb knob assembly 28 and consequently the cam 30 is removed. This makes any runaway control which is not under the direction of the operator impossible. This fail-safe operation is accomplished by a bi-directional torsion spring assembly 38, best seen in FIG. 4, comprising a spring 51 mounted in a space 53 formed between the support 46 and the mount plate 83. A pin 55 is directly mounted to the cam 30 and causes the ends of the spring 51 to be extended in either direction of cam rotation to produce a counter torque to any torque rotating the cam 30. This counter torque moves the cam 30 back to its neutral position whenever the torque rotating the cam 30 is removed.

From the foregoing it will be appreciated that the operation of the platform 12 and load carriage 16 is easily controlled by the thumb knob assembly 28 while the acceleration and direction of truck 10 travel is controlled by the hand grip assembly 24. These control functions are actuated by wrist and thumb manipulation of the single hand grasping the control assembly 22. These control functions are independent but may be simultaneously actuated.

Yet another independent control function may be individually actuated or actuated simultaneously with the previously outlined control function. This added function is under the control of a trip plate assembly 45 which is actuated by the fingers of the hand of the truck operator depressing a plate 40 while gripping and controlling the control handle assembly 24.

The trip plate assembly 45 is mounted on the base plate 42 and includes a switch arm 50 pivotable around a pivot 51 and being attached to the trip plate 40 at one end and contacting a runner 59 of a switch 52 at the other end. The switch arm 50 and the trip plate 40 are mounted to a spring 48 which is retained in a retaining groove 88. The spring 48 pivots the switch arm 50 to a neutral position wherein the switch 52 is unactuated.

Whenever the truck operator depresses the plate 40 with a pressure sufficient to cause a compression of the spring 48, the switch arm 50 pivots on the pivot 51 and depresses the runner 59 into the switch 52 causing the switch 52 to be activated. The removal of pressure from the trip plate 40 will cause the spring 48 to pivot the switch arm 50 back to its shown neutral position allowing the runner 59 to deactivate the switch 52. It will be appreciated that the switch 52 lends itself to actuate various control functions of the truck 10. The particular control function herein described is the sounding of a warning alarm or horn. The switch 52 is connected by predetermined electrical leads 58 to a horn (not shown) on the truck 10 which is sounded whenever the switch 52 is actuated.

Although the particular application of the control assembly 22 has been shown as being specifically applicable to a vehicle such as an industrial truck 10, it will be appreciated that the assembly 22 is capable of being applied to various other devices requiring a multitude of control functions to be performed by the single hand of the operator. Certain modifications and improvements will also occur to those skilled in the control art.

What we claim as new and desire to secure by Letters Patent of the United States is:

1. A manually operated control assembly for separately actuating a number of control functions and being adapted for direct mounting to a control panel of an operator controlled industrial truck comprising:
    first rotational means for actuating a first control function of the industrial truck in response to a rotational movement of said first means;
    second rotational means mounted proximately to said first rotational means for actuating a second control function of the industrial truck in response to a separate rotation of said second means;
    linearly movable means mounted at one side of said first and second rotational means for actuating a third control function of the industrial truck in response to a depression of said linearly movable means; and
    mounting means for operably connecting said first means, said second means, and said linearly movable means into a unitary assembly capable of being mounted to the control panel of the industrial truck as a control unit providing a graspable hand support for the truck operator.

2. A manually operated control as set forth in claim 1 wherein:
    said first rotational means includes a tubular hand grip rotatable by the wrist action of the hand of the operator holding said grip;
    said second rotational means includes a thumb knob mounted at one end of said hand grip and being rotatable by the thumb movement of the hand of the operator holding said hand grip; and
    said linearly actuated means includes a depression plate mounted on the control panel side of the industrial truck to be actuated by pressure applied to said plate by the fingers of the hand of the operator holding said hand grip.

3. A manually operated control as set forth in claim 1 wherein said mounting means includes:
    a mounting base plate mountable to the control panel of the industrial truck;
    a pair of support plates spacedly mounted to said base plate to support said first rotational means and said second rotational means therebetween.

4. A manually operated control as set forth in claim 1 including:
    control signal means connected to said first rotational means for providing a variable control signal to the industrial truck in direct response to rotation of said first rotational means, said control signal means having a neutral position toward which said control signal means is returnably biased to provide fail-safe operation of said first rotational means thereby.

5. A manually operated control as set forth in claim 1 including:
    switch actuating means coupled to said second rotational means to move in response to rotation of said second rotational means; and
    switch means for providing a control signal in response to a predetermined position of said switch actuating means.

6. A manually operated control as set forth in claim 5 wherein said switch actuating means includes a cam having at least three distinct detents and said switch means includes at least three switches each of said switches being actuated by a predetermined detent of said three detents.

7. A manually operated control as set forth in claim 5 including biasing means connected to said second rotational means to returnably bias said second rotational means toward a neutral position wherein said three switches are unactuated by said detents.

8. A manually operated control as set forth in claim 7 wherein said biasing means includes a torsion spring mounted between said second rotational means and said switch actuating means to provide a counter torque to any rotation of said second rotational means.

9. A manually operated control as set forth in claim 2 including:
    a fourth switch; and
    a rocker arm pivotably connected between said depression plate and said fourth switch to pivot in response to a depression of said depression plate and actuate said fourth switch thereby.

10. A manually operated control as set forth in claim 9 including a bias spring connected to said depression plate to maintain said depression plate in a predetermined position wherein said fourth switch is unactuated by said rocker arm.

11. A hand grip control capable of providing at least three independent control signals in response to predetermined manipulation of a single hand of an operator comprising:
    a first rotating member turnable by a rotation of the hand holding said first rotating member;
    a second rotating member mounted proximate to said first rotating member and being turnable by a rotation of the thumb of the hand holding said first rotating member;
    a plate member spacedly mounted from said first rotating member to be actuated by the fingers of the hand holding said first rotating member; and
    control switch means responsive to predetermined positions of said rotating and plate members to provide control signals therefrom.

12. A hand grip control as set forth in claim 11 including:
    a mounting base plate;
    a pair of support plates spacedly mounted to said base plate to provide a mounting for said first and second rotating members therebetween; and
    said plate member being slidably mounted to said support plates to provide a movable cover for said base plate thereby.

13. A hand grip control as set forth in claim 11 including separate bias means for said first rotating member, said second rotating member, and said plate member wherein said separate bias means provides return forces to said first member, said second member, and said plate member to actuate each of said members toward a predetermined neutral position.

14. A hand grip control as set forth in claim 11 wherein said control switch means includes:
- a proportional control member connected to said first rotating member to provide an output signal proportional to the degree of rotation of said first rotating member;
- a digital control member connected to said second rotating member to provide at least three distinct constant level output signals at predetermined degrees of rotation of said second rotating member; and
- an output switch connected to said plate member to provide a fourth constant level output signal upon a predetermined depression of said plate member.

15. A hand grip control as set forth in claim 14 wherein the output signal of said proportional control member, said digital control member, and said output switch control predetermined functions in a controlled vehicle.

* * * * *